(12) United States Patent
Modi et al.

(10) Patent No.: US 9,407,645 B2
(45) Date of Patent: Aug. 2, 2016

(54) SECURITY THREAT INFORMATION ANALYSIS

(71) Applicant: Accenture Global Services Limited, Dublin (IE)

(72) Inventors: Shimon Modi, Washington, DC (US); Stephen A. Schall, Arlington, VA (US)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 14/473,730

(22) Filed: Aug. 29, 2014

(65) Prior Publication Data

US 2016/0065598 A1    Mar. 3, 2016

(51) Int. Cl.
| | | |
|---|---|---|
| G06F 21/00 | (2013.01) | |
| H04L 29/06 | (2006.01) | |
| G06F 21/57 | (2013.01) | |
| H04L 12/24 | (2006.01) | |

(52) U.S. Cl.
CPC .......... *H04L 63/1408* (2013.01); *G06F 21/577* (2013.01); *H04L 41/16* (2013.01); *H04L 63/14* (2013.01); *H04L 63/1416* (2013.01); *H04L 63/1433* (2013.01)

(58) Field of Classification Search
CPC ............ H04L 63/1416; H04L 63/1408; H04L 63/1433; H04L 41/16; H04L 63/14
See application file for complete search history.

(56) References Cited

U.S. PATENT DOCUMENTS

| | | | |
|---|---|---|---|
| 6,173,284 B1 | 1/2001 | Brown | |
| 6,704,874 B1 * | 3/2004 | Porras | H04L 12/2602 709/224 |
| 7,203,693 B2 | 4/2007 | Carlbom et al. | |
| 7,523,137 B2 | 4/2009 | Kass et al. | |

(Continued)

FOREIGN PATENT DOCUMENTS

| | | |
|---|---|---|
| EP | 2 051 468 | 10/2012 |
| JP | 06250911 | 9/1994 |

(Continued)

OTHER PUBLICATIONS

"Common Vulnerability Scoring System (CVSS)" wikipedia.org [online] retrieved on Jul. 15, 2015. Retrieved from the Internet: <URL: https://en.wikipedia.org/wiki/CVSS>, 8 pages.

(Continued)

*Primary Examiner* — Kaveh Abrishamkar
*Assistant Examiner* — Thomas Ho
(74) *Attorney, Agent, or Firm* — Fish & Richardson P.C.

(57) ABSTRACT

Methods, systems, and apparatus, including computer programs encoded on computer storage media, for analyzing data that includes security threat information. One of the methods includes identifying intelligence types that each categorizes a subset of data, associating, for each of the intelligence types, each of the subsets of data, which are categorized by the respective intelligence type, with the respective intelligence type, determining rules for a third party that each indicate that the third party should receive data associated with particular types of potential security threats and priority information for the data, determining, for each of the potential security threats indicated in the rules, a group of the subsets that include information associated with the respective potential security threat, assigning, for each subset in each of the groups, a priority to the respective subset using the priority information, and providing the determined subsets to the third party using the respective priorities.

43 Claims, 7 Drawing Sheets

(56) References Cited

U.S. PATENT DOCUMENTS

| | | | |
|---|---|---|---|
| 8,024,795 B2 | 9/2011 | Newton | |
| 8,504,879 B2 | 8/2013 | Poletto et al. | |
| 8,516,104 B1 | 8/2013 | Liu et al. | |
| 8,538,911 B2 | 9/2013 | Kass et al. | |
| 2002/0078381 A1* | 6/2002 | Farley | G06F 21/552 726/23 |
| 2003/0033318 A1 | 2/2003 | Carlbom et al. | |
| 2003/0182310 A1 | 9/2003 | Charnock et al. | |
| 2005/0071445 A1* | 3/2005 | Siorek | H04L 43/18 709/223 |
| 2005/0114493 A1 | 5/2005 | Mandato et al. | |
| 2005/0185823 A1 | 8/2005 | Brown et al. | |
| 2006/0230071 A1 | 10/2006 | Kass et al. | |
| 2007/0067848 A1 | 3/2007 | Gustave et al. | |
| 2008/0005796 A1* | 1/2008 | Godwood | G06F 21/564 726/24 |
| 2008/0109730 A1 | 5/2008 | Coffman et al. | |
| 2008/0295172 A1 | 11/2008 | Bohacek | |
| 2008/0307525 A1 | 12/2008 | Nickle | |
| 2009/0219154 A1* | 9/2009 | Kukula | G06K 9/00006 340/540 |
| 2010/0071061 A1 | 3/2010 | Crovella et al. | |
| 2010/0180344 A1* | 7/2010 | Malyshev | G06F 21/566 726/23 |
| 2010/0223499 A1* | 9/2010 | Panigrahy | G06F 11/0709 714/19 |
| 2011/0185421 A1 | 7/2011 | Wittenstein | |
| 2011/0185422 A1 | 7/2011 | Khayam | |
| 2012/0096549 A1 | 4/2012 | Amini et al. | |
| 2012/0173710 A1 | 7/2012 | Rodriguez | |
| 2012/0254088 A9 | 10/2012 | Kass et al. | |
| 2013/0019008 A1 | 1/2013 | Jorgenson | |
| 2014/0157405 A1 | 6/2014 | Joll | |

FOREIGN PATENT DOCUMENTS

| | | |
|---|---|---|
| WO | WO 2005/107414 | 11/2005 |
| WO | WO 2005/111805 | 11/2005 |
| WO | WO 2011/095988 | 8/2011 |
| WO | WO 2013/014672 | 1/2013 |

OTHER PUBLICATIONS

"Common Vulnerability Scoring System v3.0: Specification Document," first.org [online]. Jun. 12, 2015 [retrieved on Jul. 15, 2015]. Retrieved from the Internet: <URL: https://www.first.org/cvss/cvss-v30-specification-v1.4.pdf>, 19 pages.

"Protect Your PEO," crowdstrike.com [online] retrieved on Jul. 15, 2015. Retrieved from the Internet: <URL: http://www.crowdstrike.com>, 2 pages.

Extended European Search Report in Application No. 15168872.8, dated Oct. 20, 2015, 6 pages.

Office action in AU Application No. 2015202706, issued Oct. 30, 2015, 3 pages.

U.S. Non-Final Office Action for U.S. Appl. No. 14/285,487 dated Oct. 7, 2015, 22 pages.

Anonymous: "Characterizing Malware with MAEC and STIX," [Apr. 21, 2014]. Retrieved from: URL:http://stixproject.github.io/about/Characterizing_Malware_MAEC_and_STIX_v1.0.pdf [retrieved on Dec. 7, 2015] 8 pages.

Farnham et al., "Tools and Standards for Cyber Threat Intelligence Projects," SANs Institute InfoSec Ready Room, pp. 2-21 (Oct. 14, 2013).

Extended European Search Report in Application No. 15181386.2, dated Dec. 16, 2015, 10 pages.

Polepeddi, "Software Vulnerability Taxonomy Consolidation," Thesis, Jan. 5, 2005, 43 pages. Retreived from the Internet: URL: http://www.osti.gov/bridge/product.biblio.jsp?osti_id=15020074 [retrieved on Nov. 2, 2007].

Extended European Search Report in Application No. 15181400.1 dated Jan. 27, 2016, 7 pages.

Canadian first Examiner's Report for Application No. 2,602,564 dated Mar. 1, 2013, 2 pages.

European Patent Office dated Dec. 18, 2007 for co-pending European Patent Office Application No. 07253957.0, 8 pages.

European Patent Office dated Feb. 4, 2008 for co-pending European Patent Office Application No. 06 742 600.7, 3 pages.

PCT International Preliminary Report on Patentability for Application No. PCT/EP2006/003533 dated Oct. 18, 2007, 13 pages.

PCT Notification of Transmittal of the International Search Report and the Written Opinion for International Application No. PCT/EP2006/003533 dated Sep. 8, 2006, 18 pages.

U.S. Final Office Action for U.S. Appl. No. 11/387,173 dated Aug. 14, 2008, 16 pages.

U.S. Final Office Action for U.S. Appl. No. 12/405,026 dated Dec. 12, 2011, 21 pages.

U.S. Non-Final Office Action for U.S. Appl. No. 11/387,173 dated Feb. 22, 2008, 16 pages.

U.S. Non-Final Office Action for U.S. Appl. No. 12/405,026 dated May 4, 2011, 19 pages.

U.S. Notice of Allowance for U.S. Appl. No. 11/387,173 dated Dec. 12, 2008, 19 pages.

U.S. Notice of Allowance for U.S. Appl. No. 12/405,026 dated Apr. 25, 2012, 13 pages.

U.S. Notice of Allowance for U.S. Appl. No. 12/405,026 dated Jun. 12, 2013, 21 pages.

"KBMS—Prototype KRISYS usermanual overview" KBMS—Prototype KRISYS User Manual, Dec. 1992, p. 1-94, XP002193794.

Accenture, Technology Labs, Discover What Your Customers Really Think, 2pp., Accenture 2005.

Allan et al.: "Taking Topic Detection From Evaluation to Practice" Proceedings of the 38th International Conference on System Sciences, Jan. 3, 2005, 10 pages, XP010762602.

Birnbaum et al., "Analogy, Intelligent IR, and Knowledge Integration for Intelligence Analysis" Ai Technologies For Homeland Security, Papers From The 2005 Aaai Spring Symposium, Mar. 21, 2005, XP002390865 Menlo Park, CA Retrieved from the Internet: URL:http://www.infolab.northwestern.edu/infolab/downloads/papers/paper10142.pdf> [retrieved on Jul. 19, 2006], 6 pages.

Bloglines, Create a Personal Bloglines Page Loaded with the Freshest News About the Things You Love, 1p., 2003.

Chung and Mcleod: "Dynamic Topic Mining from News stream Data" COOPIS/DOA/ODBASE 2003, [Online] 2003, pp. 653-670, XP002391208 Retrieved from the Internet:URL:http://www.springerlink.com/(zb2dxr55xIjuq5453e2bnj55)/app/home/contribution.asp?referrer=parent& backto=issue,42,95; journal,1127,3908; linkingpublicationresults, 1:10 5633,1> [retrieved on Jul. 19, 2006].

ClearforestText-Driven Business Intelligence, ClearForest Tagging & Extraction Platform, 2pp., 2006.

Genalytics Auto, List Management Solution, Genalytics, Auto: List Management Solution for Driving Successful Campaigns, 2pp., Genalytics, Inc., 2006.

Genalytics Data Sheet, Genalytics, Genalytics Knowledge Extract: Extract Meaning from Your Uninstructed, Data, 2pp., Genalytics, Inc. 2004.

Genalytics DB Extract, Advanced Data Extraction, Genalytics DB Extract: Advanced Data Extraction, Transformation and Scoring for Enterprise Data, Genalytics, Inc. 2006, 2 pages.

Genalytics Model, Leverage More Data, Create Better Models, 2pp., Genalytics, Inc., 2006.

Genalytics Prospect, Automated Analytics and Targeted Analytics and Targeted Lists, 2pp., Genalytics, Inc., 2006.

http://genalytics.com, Building Next Generation Predictive Models Using Genetic Algorithm-based Software, 14pp Genalytics, Inc. 2003.

Intelliseek, Brandpulse Products, BrandPulse 360™, 2pp. 1997-2006.

Intelliseek, Brandpulse Products, BrandPulse CRM™, 2pp., 1997-2006.

Intelliseek, Brandpulse Products, BrandPulse Internet™, 2pp., 1997-2006.

Intelliseek, Brandpulse Products, BrandPulse™ Direct, 2pp., 1997-2006.

(56) References Cited

OTHER PUBLICATIONS

Intelliseek, Brandpulse Products, BrandPulse™ Overview, 2pp., 1997-2006.
Inxight ThingFInder®️ Advanced, Inxight ThingFinder Advanced with Custom Entity Extraction, ThingFinder Advanced Delivers New Extensibility for Inxight Extraction Solutions, 1p., 2006.
Inxight, Inxight SmartDiscovery®️ Analysis Adapters and Connectors, 2pp., Inxight Software Inc., 2005.
Liu Hugo et al: "ConceptNet—a practical commonsense reasoning tool-kit" Bt Technol J; Bt Technology Journal Oct. 2004, [Online] vol. 22, No. 4, Oct. 2004, pp. 211-226, XP002391209. Retrieved from the Internet: URL:http://web.media.mit.edu/{push/Concept Net-BTTJ.pdf> [retrieved on Jul. 19, 2006].
Makkonen: "Investigations on Event Evolution in TDT" CITESEER, [Online] 2003, XP002391206. Retrieved From the Internet: URL:Http://Citeseer.Ist.Psu.Edu/706354.Htm l> [Retrieved On Jul. 19, 2006], 6 pages.
McCallum, Bow: A Toolkit for Statistical Language Modeling, Text Retrieval Classification and Clustering, 2pp., Sep. 12, 1998.
McCallum, Rainbow, 6pp., Sep. 30, 1998.
NLTK: The Natural Language Toolkit. Edward Loper and Steven Bird, Proceedings of the ACL Workshop on Effective Tools and Methodologies for Teaching Natural Language Processing and Computational Linguistics, Philadelphia, Association for Computational Linguistics, pp. 62-69. Jul. 2002.
NLTK: The Natural Language Toolkit. Steven Bird and Edward Loper. Proceedings of the ACL demonstration session, Barcelona, Association for Computational Linguistics, pp. 214-217. Jul. 2004.
NLTK-Lite: Efficient Scripting for Natural Language Processing. Steven Bird. Proceedings of the 4th International Conference on Natural Language Processing (ICON). pp. 11-18, Kanpur, India. New Delhi: Allied Publishers. Dec. 2005.
Nallapati et al: "Event threading within news topics" Proceedings of the Thirteenth Acm Conference on Information and Knowledge Management (CIKM), [Online] 2004, pp. 446-453, XP002390646. Retrieved from the Internet: URL:http://www.cs.umass.edu/ {nmramesh/p425-nallapati .pdf> [retrieved on Jul. 19, 2006].
Soderland, "Learning information extraction rules for semi-structured and free text" Machine Learning Kluwer Academic Publishers Netherlands, [Online] vol. 34, No. 1-3, Feb. 1999, pp. 233-272, XP002391210, ISSN: 0885-6125. Retrieved from the Internet: URL:http://www.springerlink.com/media/f62clcrrlncvnj23recn/ contributions/m/2/3/n/m23n8197vg924t51.pdf> [retrieved on Jul. 19, 2006].
Taming the Analytic Data Monster: An Advanced Approach to Data Extraction and Transformation for Enterprise Analytics, pp. 1-12, Genalytics, Inc., 2004.
Technorati™, About Technorati, Currently Tracking 31 Million Sites and 2.2 Billion links, 1p., 2006.
www.genalytics.com. Data Sheet, Genalytics Phone, Genalytics Phone: Phone Append our Reverse Look Up to Validate or Target your Prospects, 1 p., Genaytics, Inc. 2005.
www.inxight.com. Inxight SmartDiscovery™ The Complete Solution for Enterprise Information Discovery, 4pp., 2005.
www.yahoo.com. Sign in, 1p. Yahoo! Inc., 2006.
Yang et al., "Learning approaches for detecting and tracking news events" IEEE Intelligent Systems, [Online] vol. 14, No. 4, 1999, pp. 32-43, XP002391207. Retrieved from the Internet: URL:http:// ieeexplore.ieee.org/iel5/5254/17016/00784083.pdf?tp=& arnumber=784083&isnumber=17016> [retrieved on Jul. 19, 2006].
Barnum, "Standardizing cyber threat intelligence information with the structured threat information eXpression (STIX)," Version 1.1; Revision 1, MITRE, Feb. 2014, 22 pages.
"Structured Threat Information eXpression—STIX—A structured language for cyber threat intelligence information," MITRE, Accessible via https://stix.mitre.org, Jul. 2013, 2 pages.
U.S. Appl. No. 13/975,993, "Identifying and classifying non-functional requirements in text," filed on Aug. 26, 2013, 56 pages.

\* cited by examiner

Threat Intel

306 Advisories

| Title | Published | Source |
|---|---|---|
| Multiple vulnerabilities in App M could allow for remote code execution | 2014-08-14 04:00:00 | A |
| Cumulative Security Update for Web Browser Z | 2014-08-13 23:54:13 | C |
| Vulnerability in App X could allow circumvention of sandbox protections | 2014-08-13 15:12:26 | B |
| Vulnerability in Media Application Y could allow remote code execution | 2014-08-13 09:24:09 | B |
| Multiple security vulnerabilities reported in hardware H | 2014-08-13 02:11:59 | C |
| Cumulative Security Update for Productivity Application P | 2014-08-13 00:22:19 | D |

308 Trending Vulnerabilities

| CVE ID | CVSS Score | Description | Published |
|---|---|---|---|
| CVE-2014-3127 | 7.8 | Cumulative Security Update for Web... | 2014-08-13 23:54:13 |
| CVE-2014-0156 | 8.6 | Buffer overflow in file system F gives... | 2014-06-18 11:59:05 |
| CVE-2014-0096 | 6.3 | File N in OS A allows remote attackers... | 2014-02-13 01:29:45 |

SECURITY THREAT INFORMATION ANALYSIS

BACKGROUND

Organizations may use security threat information to make changes to their networks, e.g., in response to perceived or actual threats. For instance, an organization may learn about a software vulnerability and install a software update that removes the vulnerability or change network settings to prevent, or reduce the likelihood, of a malicious actor exploiting the vulnerability.

SUMMARY

In general, one innovative aspect of the subject matter described in this specification can be embodied in methods that include the actions of for each dataset from multiple datasets that each include information about potential security threats: identifying, by one or more computers, one or more respective intelligence types that each categorizes a subset of data in the respective dataset, and associating, for each of the identified intelligence types, each of the subsets of data, which are categorized by the respective intelligence type, with the respective intelligence type. The method includes the actions of determining, for each of the subsets, whether the respective subset does not include information about the same threat as a different subset, determining one or more rules for a third party that each indicate that the third party should receive data associated with particular types of potential security threats and priority information for the data, determining, for each of the potential security threats indicated in the rules, a group of the subsets that include information associated with the respective potential security threat, assigning, for each subset in each of the groups, a priority to the respective subset using the priority information, and providing the determined subsets to the third party using the respective priorities. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of for each dataset from multiple datasets that each include information about potential security threats: identifying, by at least one of the computers, one or more respective intelligence types that each categorizes a subset of data in the respective dataset, and associating, for each of the identified intelligence types, each of the subsets of data, which are categorized by the respective intelligence type, with the respective intelligence type. The method includes the actions of determining one or more rules for a third party that each indicate that the third party should receive data associated with particular types of potential security threats and priority information for the data, determining, for each of the potential security threats indicated in the rules, a group of the subsets that include information associated with the respective potential security threat, assigning, for each subset in each of the groups, a priority to the respective subset using the priority information, and providing the determined subsets to the third party using the respective priorities. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of for each dataset from multiple datasets that each include information about potential security threats: identifying one or more respective intelligence types that each categorizes a subset of data in the respective dataset, and associating, for each of the identified intelligence types, each of the subsets of data, which are categorized by the respective intelligence type, with the respective intelligence type. The method includes the actions of determining, for each of the subsets, whether the respective subset does not include information about the same threat as a different subset, determining, for a third party, a group of the subsets that include information requested by the third party, assigning, for each subset in the group, a priority to the respective subset using priority information for the third party, and providing the determined subsets to the third party using the respective priorities. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Providing the determined subsets to the third party using the respective priorities may include providing the determined subsets for presentation according to the respective priorities. The method may include receiving the datasets from one or more sources, and parsing each of the datasets into the subsets of data. Identifying the respective intelligence types that each categorize a subset of data in the respective dataset may include identifying the respective intelligence types that each categorize one of the parsed subsets. The method may include determining that a first subset from the subsets does not include information about the same threat as a different subset. Determining the group of the subsets that include information associated with the respective potential security threat may include determining a group that includes the first subset.

In some implementations, the method may include determining that a first subset from the subsets includes information about the same threat as a different subset. Determining the group of the subsets that include information associated with the respective potential security threat may include determining a group that does not include the first subset. The method may include determining that the first subset includes information with an older timestamp than the corresponding different subset. Determining the group that does not include the first subset may include determining the group that does not include the first subset in response to determining that the first subset includes information with the older timestamp than the corresponding different subset. The method may include determining that the first subset includes information from a less reputable source than the corresponding different subset. Determining the group that does not include the first subset may include determining the group that does not include the first subset in response to determining that the first subset includes information from a less reputable source than the corresponding different subset. The method may include determining that content in the first subset varies from the corresponding subset by more than a threshold amount.

In some implementations, the method may include determining that a first subset from the subsets includes information about the same threat as a different subset, and merging the first subset with the corresponding different subset. The method may include determining that the first subset varies from the corresponding different subset by less than a threshold amount. Merging the first subset with the corresponding different subset may include merging the first subset with the corresponding different subset in response to determining that the first subset varies from the corresponding different subset by less than the threshold amount. The method may include determining that a first subset from the subsets includes information about the same threat as a different subset, determining that the first subset varies from the corresponding different subset by more than a threshold amount, and linking the first subset with the corresponding different subset.

In some implementations, the priority information may include priority information for the potential security threats. Determining, for each of the potential security threats indicated in the rules, the group of the subsets that include information associated with the respective potential security threats may include determining, for one of the potential security threats that identifies a particular software application used by the third party, that each of the subsets in the groups of subsets include information about the particular software application. Determining, for each of the potential security threats indicated in the rules, the group of the subsets that include information associated with the respective potential security threats may include determining, for one of the potential security threats that identifies a particular hardware device used by the third party, that each of the subsets in the groups of subsets include information about the particular hardware device.

In some implementations, the method may include determining, for each of the subsets, whether the respective subset does not include information about the same threat as a different subset. Determining, for the third party, the group of the subsets that include information requested by the third party may include determining one or more rules for the third party that each indicate that the third party should receive data associated with particular types of potential security threats and the priority information for the data. Assigning, for each subset in the group, a priority to the respective subset using priority information for the third party may include assigning, for each subset in each of the groups, a priority to the respective subset using the priority information.

The subject matter described in this specification can be implemented in particular embodiments so as to realize one or more of the following advantages. In some implementations, when a system receives data from multiple sources and stores the data in data constructs, e.g., formatted according to a standardized representation, the system reduces duplicate data sent to third parties and reduces potential confusion about related threat intelligence. In some implementations, when a system formats data received from multiple sources in data constructs, the system may improve expressiveness when describing a certain threat actor, their activities, how they operate, and possible mitigation actions. In some implementations, a system automates the process of determining duplicates and applying appropriate resolution to address duplicate data. In some implementations, a system provides users with an automatic determination of relevance of data specific to their particular infrastructure, e.g., hardware, software, or both.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3A-B are an example of a user interface for presenting security threat information.

Like reference numbers and designations in the various drawings indicate like elements.

DETAILED DESCRIPTION

Security teams, e.g., for an enterprise, may want the ability to make faster operational security decisions based on real time information. A system may automate collection, normalization (e.g., de-duplication), contextualization, prioritization, and distribution of threat intelligence to enhance security operations. For instance, the system may collect cyber threat information from a variety of sources, convert the collected information into a standardized representation, manage the information over its lifetime, create custom filters to process the information, enrich the information (e.g., with data from other sources), and draw actionable inferences about impending activities or current incidents in progress, e.g., past, present, or future events that may affect other organizations. The actionable inferences may be delivered to clients in structured machine readable format, human readable formats, or both.

Figure 1:
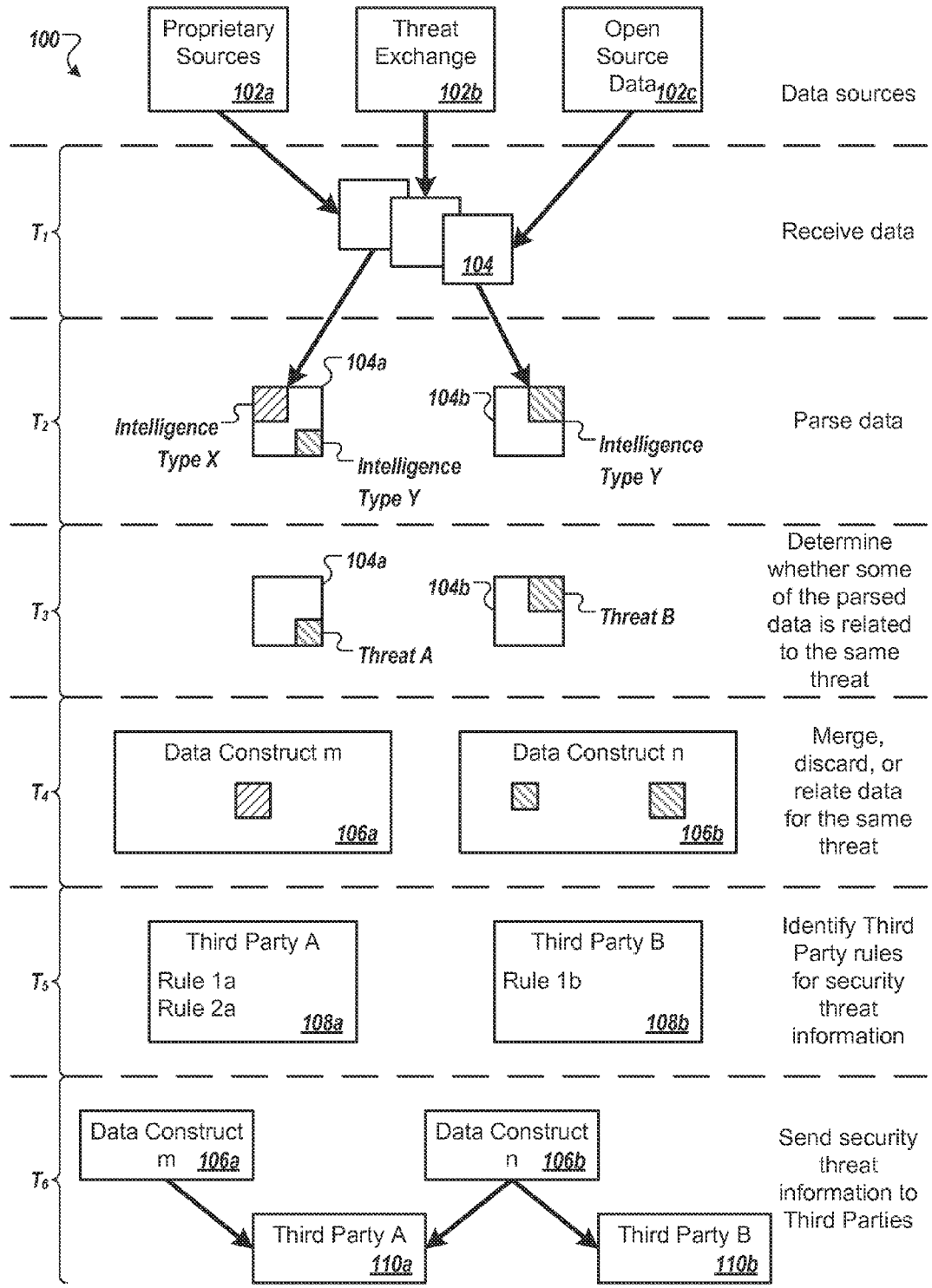
FIG. 1 is an example of an environment in which a system receives data from multiple data sources, parses the data to create structured data constructs, and provides some of the structured data to third parties.

FIG. 1 is an example of an environment 100 in which a system receives data 104 from multiple data sources 102a-c, parses the data to create structured data constructs, and provides some of the structured data to third parties. For instance, the system receives the data 104, e.g., cyber information, that is formatted according to a schema, e.g., specific to the particular data source 102*a-c*, from the data sources 102*a-c* at time $T_1$, and parses the data 104 at time $T_2$ to determine intelligence types for the parsed data. The data 104 may be received as a data feed, e.g., a separate feed for each of the sources 102*a-c* or separate feeds for a subset of the sources 102*a-c*, or through any other appropriate method.

Some examples of intelligence types may include i) observables, ii) indicators of compromise (IOC), iii) vulnerabilities, iv) exploits, v) adversary tactics, techniques, and procedures (TTP), vi) threat actors, vii) threat campaigns, and viii) courses of action (COA). Each of the intelligence types may have a corresponding data construct in the system, e.g., particular to the types of information available for or related to the respective intelligence type. For instance, the intelligence types may be formatted according to Structured Threat Information eXpression (STIX™).

Observables may be properties or measurable events pertinent to the operation of computers and networks. Some examples of observables may include information about a file, e.g., name, hash, or size, a registry key value; a service being started; or a Hypertext Transfer Protocol (HTTP) request being sent.

IOC may include certain observable conditions as well as contextual information about patterns of those observable conditions and how and when a pattern should be acted on. The contextual information may represent artifacts or behaviors of interest within a cyber-security context or both. The patterns of the observable conditions may be mapped to related TTP context information, include relevant metadata about confidence in the indicator's assertion, handling restrictions, valid time windows, likely impact, sightings of the information indicator, structured test mechanisms for detection, related campaigns, or suggested COA, or both related TTP context information and relevant metadata.

Vulnerabilities may include information about security vulnerabilities identified by independent research teams, internal teams, or security vendors. The security vulnerabilities may indicate particular vulnerabilities for an operating system, an application, or a version of an application, e.g., particular to a specific operating system.

Exploits may include information related to system vulnerabilities or the tools used to take advantage of a particular vulnerability by techniques of a threat actor. One example of exploit information may include identification or characterization of a vulnerability.

TTP may include information about how threat actors operate and perform their adversarial actions. An example tactic may include the use of malware to steal credit card credentials. An example technique may include sending emails to potential victims that include malicious attachments, e.g., used to capture credit card information. An example procedure may include research to identify potential targets for malicious email.

Threat actors may include characterizations of malicious actors that represent a cyber-threat and may include potential identity, location, specific techniques used by, presumed intent of and other observed historical behavior for the respective threat actor. Threat actors may be linked to TTPs, threat campaigns, or both, which were used by the respective threat actor or other threat actors that may be or are known to have been associated with the respective threat actor.

Threat campaigns may relate threat actors to particular IOC, exploits, TTP, or any combination of two or more of these. For instance, a threat campaign may indicate the particular procedures, and the indicators used to determine those procedures, used by a particular threat actor to compromise one or more organizations.

COA may include recommended actions to mitigate or remediate risks presented by IOC or motivation of threat actors or threat campaigns. For instance, a COA may be corrective, e.g., to fix an exploited vulnerability, or preventative, e.g., to fix a potential vulnerability or a vulnerability that has not yet been exploited, for the particular organization or another organization.

In some examples, some of the data 104, e.g., a particular subset of the data 104, may be associated with multiple intelligence types. For instance, a feed received from a first source may include a particular subset with information that can be categorized as a threat actor and as a threat campaign.

In the example shown in FIG. 1, a first set of data 104*a* includes two subsets of data, a first that is categorized as intelligence type X and a second that is categorized as intelligence type Y. A second set of data 104*b* includes one subset, e.g., as shown and may include many additional subsets that are not shown, that is categorized as intelligence type Y.

At time $T_3$, the system determines whether some of the parsed data is related to the same threat. The system may compare all of the data that is related to the same intelligence type, e.g., intelligence type Y, to determine if a subset of that data is related to the same threat. For instance, the system determines that threat A and threat B, identified by the first set of data 104*a* and the second set of data 104*b* respectfully, are the same threat and how the related data should be stored in the system. In some examples, the system determines whether some data for different intelligence types is related to the same threat, e.g., the same threat actor.

The system determines a relationship for the data that is related to the same threat and how that relationship should be identified. For example, at time $T_4$, the system may merge two sets or subsets of data when creating a data construct n 106*b*; discard some of the data, e.g., one of the subsets, and create a single data construct m 106*a*; or relate two separate data constructs, one of which may be newly created and the other previously created or both of which may be newly created. For instance, the data construct n 106*b* may include data subsets from both the first set of data 104*a* and the second set of data 104*b*, both of which correspond to intelligence type Y.

When multiple datasets, or subsets, are related to the same threat and include the same information, e.g., all of the same information, the system may discard the older datasets and keep the newest dataset for a construct. Similarly, when multiple subsets are related to the same threat and include most of the same information, e.g., the newest dataset includes more information or updated information, the system may discard the older datasets and keep the newest dataset. In some examples, when an IOC subset or data construct includes the same observables, or links to the data constructs for the same observables, as another IOC subset or data construct, the system determines that the two are related to the same threat.

In some implementations, the system may discard a dataset when two datasets are related to the same threat but the information included in the two datasets varies by more than a threshold amount, e.g., by more than a predetermined percentage or by a predetermined quantity, such as a quantity of words, phrases, sentences or paragraphs. The discarded dataset may be the older dataset or the dataset from a less reputable source.

For instance, the system may use historical analysis of information from a certain source to determine a reputation for that source, e.g., historical analysis of how actionable is the information from a certain source. In some examples, the system may determine how much data from source A overlaps with a known well-reputed source. If there is a high overlap between data from source A and the well-reputed source, the system may assign a high reputation to the source A. In one example, an analyst may dynamically assign a reputation score to a source. The system may use any appropriate method to determine a source's reputation.

When a subset or a data construct includes a confidence score, the element with the highest confidence score may be kept, e.g., and the other data discarded. The confidence score may represent a probability that the data in the data construct is accurate or a probability that the data in the data construct is from a reputable source. In some examples, the system may discard data with a lower confidence score when there is more than a twenty percent difference between the two confidence scores.

When multiple subsets of data are related to the same threat, e.g., determined using an identifier for the threat, the system may discard the subsets from the less reputable sources and keep the subsets from the more reputable sources. For instance, the system may create a data construct using the data from the more reputable sources. In some examples, if a cost, efficacy, affected software, confidence score, victim, time, leveraged TTPs, or attributed threat actors for a data construct or a subset, e.g., a COA, an exploits, or an incident data construct, are different than an existing data construct or another subset, the system may use the subset or data construct from the more reputable source, e.g., when each data construct includes a "source" element.

When multiple subsets of data are related to the same threat, but the content of the subsets is different, e.g., by more than a threshold amount, the system may create a data construct for each of the subsets and relate each of the created data constructs with each other. For instance, each data construct may include an identifier or one or more pointers that the system may use to determine the related data constructs, e.g., using a "related packages" element in the respective data construct.

In some examples, if a name in a subset of data is similar to a name in another subset of data, or in an existing data construct, e.g., when the names are used to identify the data, the system may relate a new data construct for the subset to a data construct for the other subset, or the existing data construct. The similarity in the name may allow for small errors, e.g., one character differences, and extensions of names, e.g., where "cat" and "cat_1" are considered matches.

Once the data constructs are created, or for data that was previously placed in data constructs and not yet sent to a specific third party, at time $T_5$, the system identifies third party rules 108a-b for security threat information. The rules are particular to a specific third party. For example, Third Party A 110a may have rules 1a and 2a and Third Party B 110b may have rule 1b.

The rules for the different third parties may be the same or different. For instance, rule 1b may be the same as rule 2a, e.g., may identify the same types of intelligence types or the same subsets of intelligence types. These two rules may indicate that both third parties want to receive information about intelligence type Y, and the rule 1a may indicate that Third Party A would like to receive information about intelligence type X. In one example, a rule may indicate that the corresponding third party is interested in vulnerabilities for particular applications, operating systems, hardware, or two or more of these.

The rules may include a destination, e.g., a system address for the particular third party. In some examples, the rules do not include a destination, and the system determines a destination using the particular third party to which the rule corresponds. The destination may be an internet protocol (IP) address, a uniform resource identifier (URI), or another appropriate type of identifier for the third party or a system, e.g., computer, used by the third party. When two rules for different third parties are the same, e.g., identify the same types of threat intelligence data, the two rules may include different destinations that correspond with the respective third party.

At time $T_6$, the system sends data constructs, identified using the third party rules 108a-b, to the respective third parties 110a-b. For instance, the system sends the data construct m 106a to the Third Party A 110a and the data construct n 106b to both the Third Party A 110a and the Third Party B 110b. The data constructs provided to the third parties may be prioritized, e.g., using the third party rules 108a-b or other data, as described in more detail below.

One or more of the third parties 110a-b may use the data constructs 106a-b to adjust rules for an intrusion detection system (IDS), an intrusion prevention system (IPS), or both. For instance, The Third Party B 110b may receive courses of action from the system and update rules for an intrusion prevention system using the received courses of action. In one example, the Third Party B 110b may receive indicators of compromise, vulnerabilities, and exploits from the system, determine which of those threats are relevant to the Third Party B 110b, e.g., relevant to devices associated with the Third Party B 110b, and request courses of action from the system for the threats that are determined to be relevant to the Third Party B 110b. The Third Party B 100b may then use the received courses of action to update corresponding systems or policies, e.g., to prevent or reduce the likelihood of those threats occurring.

Some of the third parties 100a-b may analyze the data in the data constructs 106a-b, e.g., to determine historical perspectives, trends, or both. For instance, the Third Party A 100a may perform frequency analysis, determine clusters of threat relationships, or identify specific actors using the data constructs 106a-b.

In some examples, a third party may use received data constructs to determine potential tests for the third party's systems. For instance, the third party may test a potential vulnerability and determine how to manage the potential vulnerability.

In some implementations, a third party system may determine if one or more indicators, one or more observables, or a combination of the two, are currently occurring within the third party's infrastructure and, if so, perform an appropriate corrective action. In some implementations, a network resource manager, e.g., an IDS, may detect anomalous behavior, e.g., network behavior, and determine whether this behavior maps to indicators or observables received from the system. When the network resource manager determines that the behavior maps to data received from the system, the network resource manager may request additional information about the mapped indicators or observables from the system. For instance, the network resource manager may request and receive courses of action for the mapped indicators or observables, e.g., that the system identifies using relationships between the indicators or observables and the respective courses of action.

Figure 2:
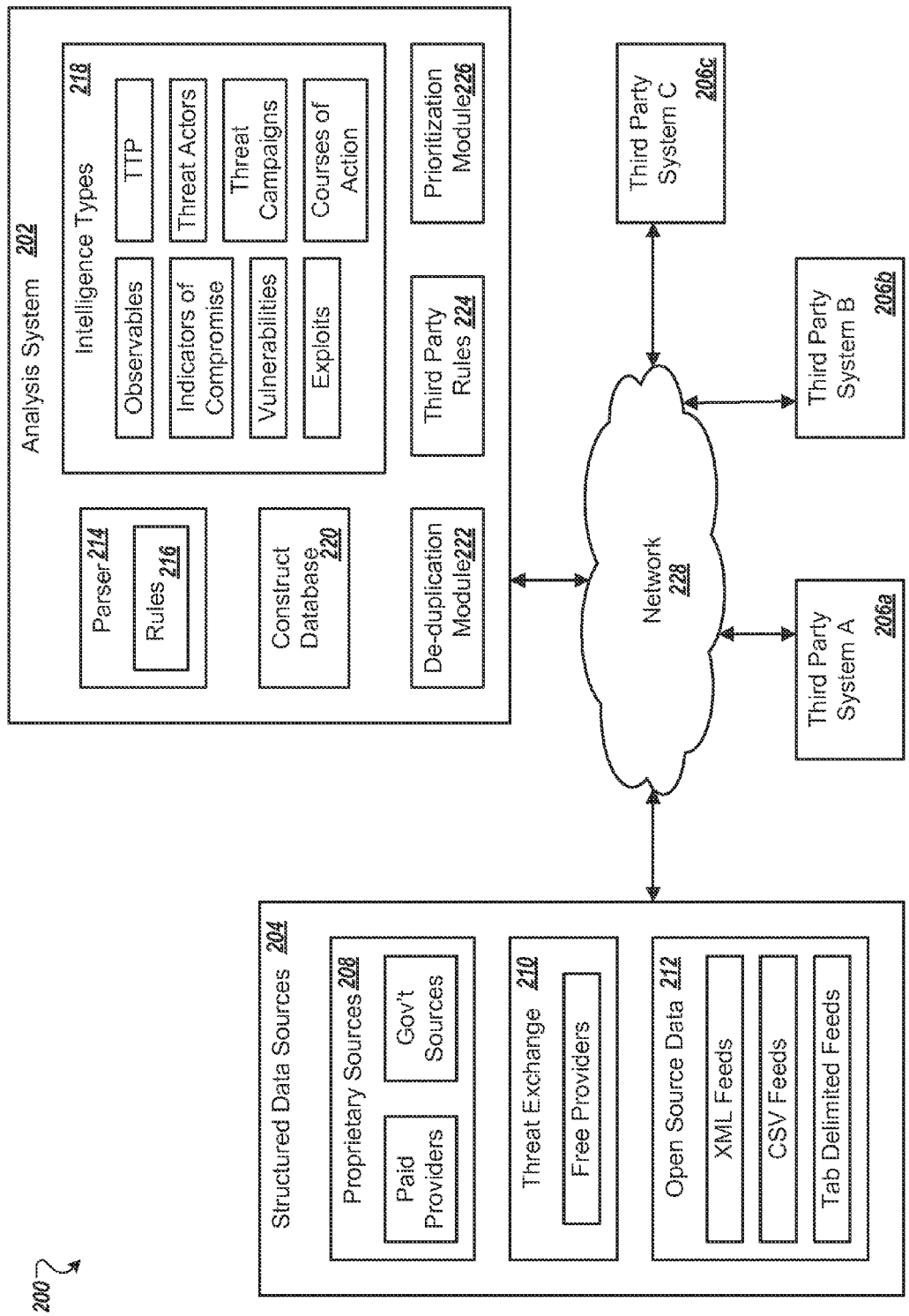
FIG. 2 is an example of an environment in which an analysis system receives data from multiple structured data sources, parses the received data, and provides some of the parsed data to one or more third party systems.

FIG. 2 is an example of an environment 200 in which an analysis system 202 receives data from multiple structured data sources 204, parses the received data, and provides some of the parsed data to one or more third party systems 206a-c. The structured data sources 204 may include multiple proprietary sources 208. Some examples of proprietary sources 208 may include paid providers, to which the analysis system 202, or another system or party associated with the analysis system 202, provides compensation for data received by the analysis system 202, and government sources. For instance, a government agency may make threat information publically available to other systems, including the analysis system 202, upon request or may send the threat information to the analysis system 202 upon determining new threat information. The analysis system 202 may receive data from each of the proprietary sources 208 in a proprietary format, e.g., in a data feed formatted specific to the particular proprietary source, or an open format.

The structured data sources 204 may include a threat exchange 210 that provides data to the analysis system 202 for free. The threat exchange 210 may require that the analysis system 202 provides the threat exchange with threat information in order to access threat information provided to the threat exchange 210 by other sources. For instance, the threat exchange 210 may receive data from one or more free content providers and provide that data to the analysis system 202, e.g., in exchange for data received from the analysis system 202 or not.

The analysis system 202 may receive open source data 212 from some of the structured data sources 204. For example, the analysis system 202 may receive an Extensible Markup Language (XML) feed, a feed with comma-separated values (CSV), or a tab delimited feed.

One or more of the structured data sources 204 may overlap with other types of the structured data sources 204. For instance, one of the proprietary sources 208 may provide an XML feed, a CSV feed, a tab delimited feed, or free threat information. In some examples, some of the proprietary sources 208 may make data available on the threat exchange 210, e.g., for free or for a fee. Some of the open source data 212 may be made available on the threat exchange 210.

A parser 214, included in the analysis system 202, receives the structured data from the structured data sources 204 and uses rules 216 to determine which intelligence types 218 apply to the structured data. For example, the rules may indicate that data from a particular source or data with particular keywords corresponds with an observables intelligence type, and data with a different set of keywords, some of which may be the same as the keywords for the observables intelligence type, corresponds with a vulnerabilities intelligence type. Some examples of intelligence types include observables, indicators of compromise (IOC), vulnerabilities, exploits, threat actors, threat campaigns, courses of action (COA), and adversary tactics, techniques, and procedures (TTP).

The parser 214 may receive multiple data packets from a single one of the structured data sources 204 that together form a single dataset. The dataset may include information about a particular threat or about multiple threats.

Using the rules, the parser 214 determines that the single dataset includes data specific to one or more of the intelligence types 218. For instance, the parser 214 may determine that a dataset received from a government source XML feed includes information about observables, exploits, and threat actors. Some of the same data from the dataset may be associated with multiple of the intelligence types 218, e.g., both observables and threat actors, and some of the data from the dataset may be associated with only one of the intelligence types, e.g., observables.

For each of the intelligence types for the single dataset or subset, the parser 214 creates a data construct specific to the respective intelligence type and stores the data construct in a construct database 220. For example, the parser 214 may create a data construct for an observable, a threat campaign, a COA, a vulnerability, or an exploit that includes an identifier for the data construct and the subset of data from the dataset that corresponds with the intelligence type. In some examples, the data constructs may include an identifier for the source of the data, e.g., the particular structured data source 204 from which the analysis system 202 received the data, a time stamp, e.g., for when the corresponding data was generated by or received from the respective structured data source, a source reputation, a severity, a severity reputation, or a combination of two or more of these.

Some of the data constructs may include links to other data constructs. For instance, a data construct for an IOC may include one or more links to data constructs for corresponding observables and a threat actor data construct may include one or more links to threat campaigns or TTP used by the respective actor. Some of the data constructs, e.g., for IOC, threat actors, or TTP, may include a title or a name.

In some implementations, the parser 214 may create multiple data constructs for a particular intelligence type, e.g., from a single dataset. For instance, the parser 214 may determine a subset of a particular dataset that corresponds with observables and that different portions of that subset correspond with different instances of observables. One portion of the subset may include information about an HTTP request and another portion of the subset may include information about a particular file. In this example, the parser 214 creates a first observable data construct for information about the HTTP request and a second observable data construct for information about the particular file.

A de-duplication module 222, included in the analysis system 202, may determine relationships between datasets received from the structured data sources 204, parsed data, e.g., that has not yet been stored in the construct database 220, data constructs stored in the construct database 220, or any combination of two or more of these. For instance, the de-duplication module 222 may determine whether some of the data in two data constructs is related to the same threat, includes the same information about a threat, or includes information about related threats and how that information or those threats are related. The de-duplication module 222 may merge two different data constructs, relate two different data constructs, or discard one of two related data constructs, as described above.

The analysis system 202 uses third party rules 224 to determine when to send data constructs to the third parties 206a-c, what types of data constructs to send to the third parties 206a-c, and how to prioritize the data constructs, e.g., an order in which to present the data constructs to the third parties 206a-c or for the third parties 208a-c to present the information to a user. For instance, the analysis system 202 may determine to send data constructs to the third party system A 206a when relevant data constructs are created by the analysis system 202, to send data constructs to the third party system B 206b once each day, and to send data constructs to the third party system C 206c once each week. The third party rules 224 may include a particular time of day at which the analysis system 202 should send corresponding data constructs to the requesting third party systems 206a-c.

The analysis system 202, or a module of the analysis system 202, may use the third party rules 224 to determine which data constructs to send to each of the third party systems 206a-c. For instance, a first rule for the third party system A 206a may indicate that the third party A wants to receive threat information that is relevant to a particular organization or industry and a second rule for the third party system B 206b may indicate that the third party B wants to receive threat information for a particular operating system or a particular version of an operating system.

The third party rules 224 may include a corresponding destination for the requested data constructs. For instance, the first rule for the third party system A 206a may include an IP address for the third party system A 206a. In some examples, a rule may indicate that the analysis system 202 should send a first subset of data constructs to a first destination and a second subset of data constructs to a second destination. For instance, the third party system B 206b may include multiple servers and the analysis system 202 provides the first subset to a first server in the third party system B 206b and provides the second subset to a second server in the third party system B 206b.

A prioritization module 226, included in the analysis system 202, may use the third party rules 224 to determine a priority for each of the data constructs requested by a particular one of the third party systems 206a-c. For instance, after the analysis system 202 determines the data constructs to provide to the third party system C 206c, the prioritization module 226 determines the order in which the data constructs are provided to the third party system C 206c or presented on a user interface on the third party system C 206c, e.g., based on instructions provided by the analysis system 202 to the third party system C 206c for the presentation of the information included in the requested data constructs.

The prioritization module 226 may analyze how recently a threat, e.g., that is represented by a corresponding data construct, was used or identified, the severity of the threat, whether a government source has released a statement about the threat, or any combination of two or more of these when prioritizing the data constructs. For instance, the prioritization module 226 may assign a data construct for a newer threat a higher priority than another data construct for an older threat. The prioritization module 226 may assign a data construct for a more severe threat a higher priority than another data construct for a less severe threat, e.g., irrespective of the newness of either of the threats.

The prioritization module 226 may determine a severity of a threat using comments included in data from the structured data sources 204 or from other sources. For instance, the prioritization module 226 may assign a data construct a default, e.g., low or medium, severity unless the prioritization module 226 determines that comments that correspond with a threat represented by a data construct indicate that the threat should be associated with a different, e.g., higher, severity.

The third party systems 206a-c may use the received data constructs, and the priority in which the data constructs are received or identified for presentation, to take corresponding actions based on the threats identified in the data constructs. For instance, the third party system A 206a may be an automated system that determines whether the indicated threat is relevant to the third party A, e.g., whether or not any devices for the third party A may be affected by the indicated threat. Upon determining that a particular threat is relevant to the third party A, e.g., that a device may be compromised because of the indicated threat, the automated system may request a course of action (COA) from the analysis system 202 that corresponds with the particular threat. The third party system A 206a may analyze the data constructs in the order the data constructs are received from the analysis system 202, e.g., according to the priority of the data constructs. The analysis system 202 may provide data constructs to third party systems 206a-c using an application programming interface (API), a feed, e.g., XML or rich site summary (RSS), or any other appropriate type of method or protocol.

In some examples, the analysis system 202 provides instructions to one of the third party systems 206a-c, e.g., the third party system B 206b, for the presentation of a user interface that includes information about the requested data constructs and the threats indicated by those data constructs. The user interface presents the threats according to the priority determined by the prioritization module 226, e.g., with higher priority threats presented before lower priority threats. When the third party system receives additional data constructs from the analysis system 202, the third party system may merge the most recently received data constructs, or information associated with these data constructs, with a current presentation of other previously received data constructs, or information associated with those data constructs. For instance, using the instructions received from the analysis system 202, the third party system may determine that a first newly received data construct has a higher priority than a currently presented data construct and present the first newly received data construct above the currently presented data construct in a user interface. A second newly received data construct may have a lower priority than, and be presented below, the currently presented data construct.

In these examples, a user may view the user interface and determine which of the threats are relevant to the third party C and which threats require a corresponding action to be taken. For instance, a device operated by the user may request additional information about a particular threat, such as a COA, from the analysis system, e.g., when an action should be taken for a threat. Upon receipt of the COA, the device operated by the user or another device, e.g., an automated device, may perform the action identified by the COA, e.g., to prevent or reduce the likelihood of the threat.

In some implementations, the prioritization module 226 may use learning to determine how to prioritize data constructs that will be sent to the third party systems 206a-c. For instance, the prioritization module 226 may receive requests for COAs from the third party system C 206c, determine that the types of threats associated with these COAs should have a higher priority than other types of threats for which the third party system C 206c requested information, and update corresponding third party rules, or a prioritization module for the third party C, to indicate which types of threats should have a higher priority.

The prioritization module 226 may use a list of hardware manufacturers, a list of device models, a list of software developers, a list of software versions, a list of firewall rules, a list of intrusion prevention system rules, a list of malware rules, information source data, whether a course of action was performed, e.g., by the respective third party system, whether a patch was applied, e.g., by the respective third party system, or any combination of two or more of these when determining a data construct priority for one of the third party systems 206a-c. The particular third party system 206a-c may include any combination of prioritization rules, and rules for data constructs of interest, when defining the corresponding third party rules 224.

In some examples, the prioritization module 226 may filter out data constructs for particular hardware manufacturers, device models, software developers, software versions or any combination of two or more of these, determined not to be relevant to a particular one of the third party systems 206a-c, e.g., and not send these data constructs to the particular third party system. The prioritization module 226 may filter out data constructs for particular data sources, e.g., when a third party rule indicates that data constructs from the particular data sources should not be sent to the corresponding third party system or when the third party system should only receive data constructs for data from a predetermined list of data sources that does not include any of the particular data sources.

In some implementations, the prioritization module 226 might not send any COAs to one or more of the third party systems 206a-c, e.g., unless one of the third party systems 206a-c requests a specific COA, at which time the analysis system 202 provides the respective third party system with the specific COA. In some examples, the prioritization module 226 determines whether a particular data construct relates to a malware signature, a firewall rule, or both, that has already been added to a corresponding firewall or anti-virus configuration. If so, the analysis system 202 might not send a corresponding data construct to the respective third party system. If not, the analysis system 202 sends the corresponding data structure to the respective third party system.

A network 228, such as a local area network (LAN), wide area network (WAN), the Internet, or a combination thereof, connects the analysis system 202, the structured data sources 204, and the third party systems 206a-c. For instance, the analysis system 202 may receive structured data from the structured data sources 204 using the network 228 and provide data constructs to one or more of the third party systems 206a-c using the network 228.

Figure 3A:
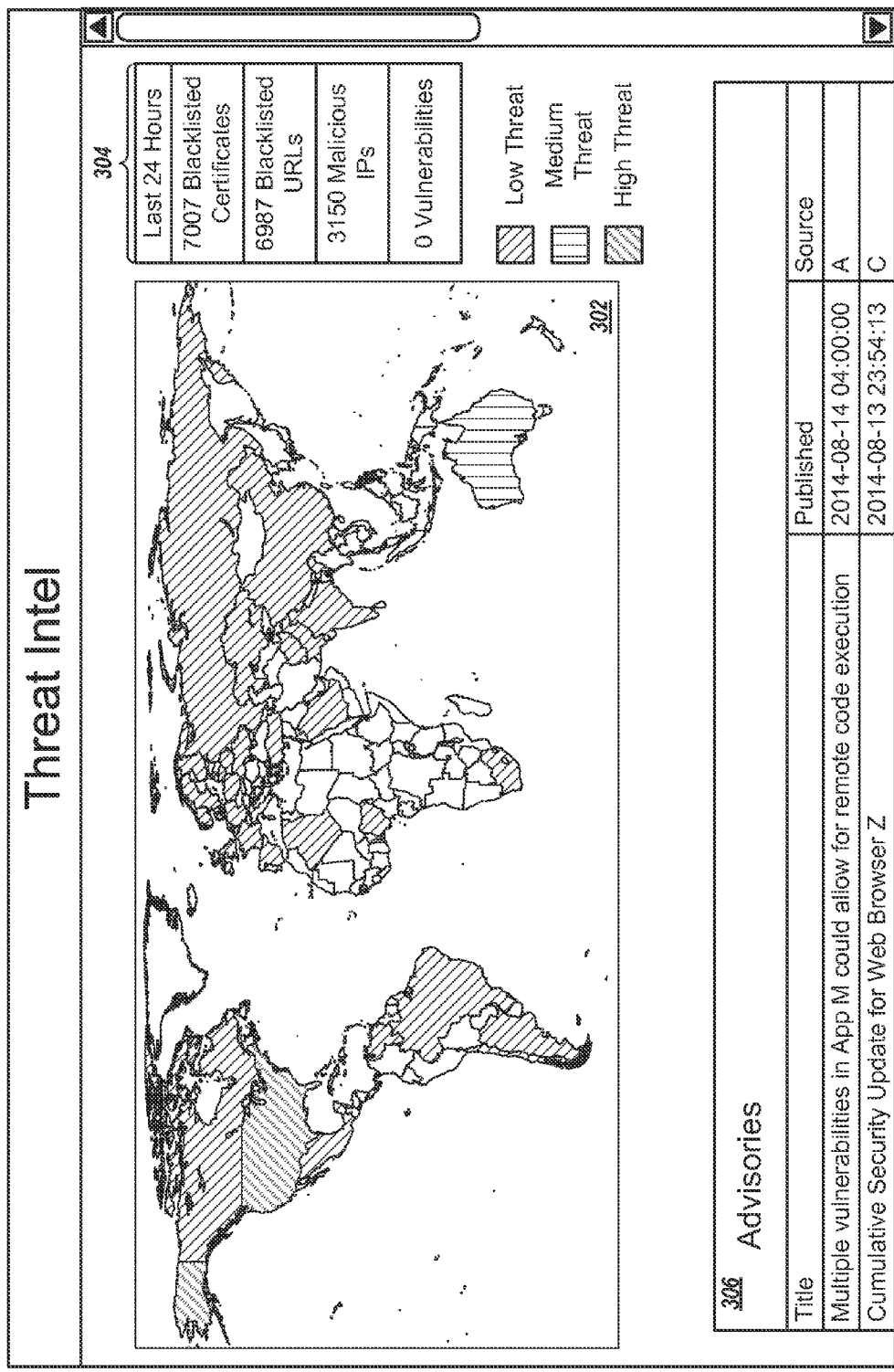

FIGS. 3A-B are an example of a user interface 300 for presenting security threat information. As shown in FIG. 3A, the user interface 300 includes a map 302 that shows a geo-location mapping of the security threat information gathered from different sources, e.g., structured data sources. Shading in the map 302, e.g., a color of a particular country, may indicate a quantity of threats, e.g., with respect to the other countries. For instance, more malicious IP addresses and malicious uniform resource locators (URLs), or uniform resource identifiers (URIs), originate from a high threat country than a low or a medium threat country. The map 302 may include any appropriate identifier for the different threat severities of the countries.

The user interface 300 may include a summary 304 of recent malicious activity. For instance, the summary 304 may change dynamically based on the types of security threats during a predetermined period of time, e.g., the past day, week, or month. The summary 304 may include a quantity of blacklisted certificates, e.g., 7007, a quantity of blacklisted URLs, e.g., 6987, a quantity of malicious IP addresses, e.g., 3150, and a quantity of vulnerabilities identified during the predetermined period of time, e.g., zero.

An advisories section 306, shown in FIG. 3B, includes a list of the latest threat advisories. The advisories section 306 includes a title for each advisory, a date and time when the advisory was published, and a source that provided the advisory to the system, e.g., a structured data source. The advisories section 306 may include links to corresponding full advisory pages, e.g., with additional details about the respective advisory. For instance, selection of a title for a particular advisory may cause the user interface 300, or another user interface, to present the corresponding full advisory page.

A trending vulnerabilities section 308 includes the most relevant vulnerabilities, most prevalent vulnerabilities, or a combination of the two, and corresponding descriptions of each vulnerability. The trending vulnerabilities section 308 may include a common vulnerabilities and exposures (CVE) identifier for each of the vulnerabilities. The trending vulnerabilities section 308 may include a common vulnerability scoring system (CVSS) score for each of the vulnerabilities.

The analysis system 202 may provide a third party system with instructions for the presentation of the user interface 300 in response to receipt of a request for security threat information. For instance, a user of a third party system may cause the third party system to request the user interface 300 from the analysis system. In some examples, a third party system may receive data constructs from the analysis system 202 and generate the user interface 300 using the received data constructs, e.g., and additional data stored on the third party system.

Figure 4:
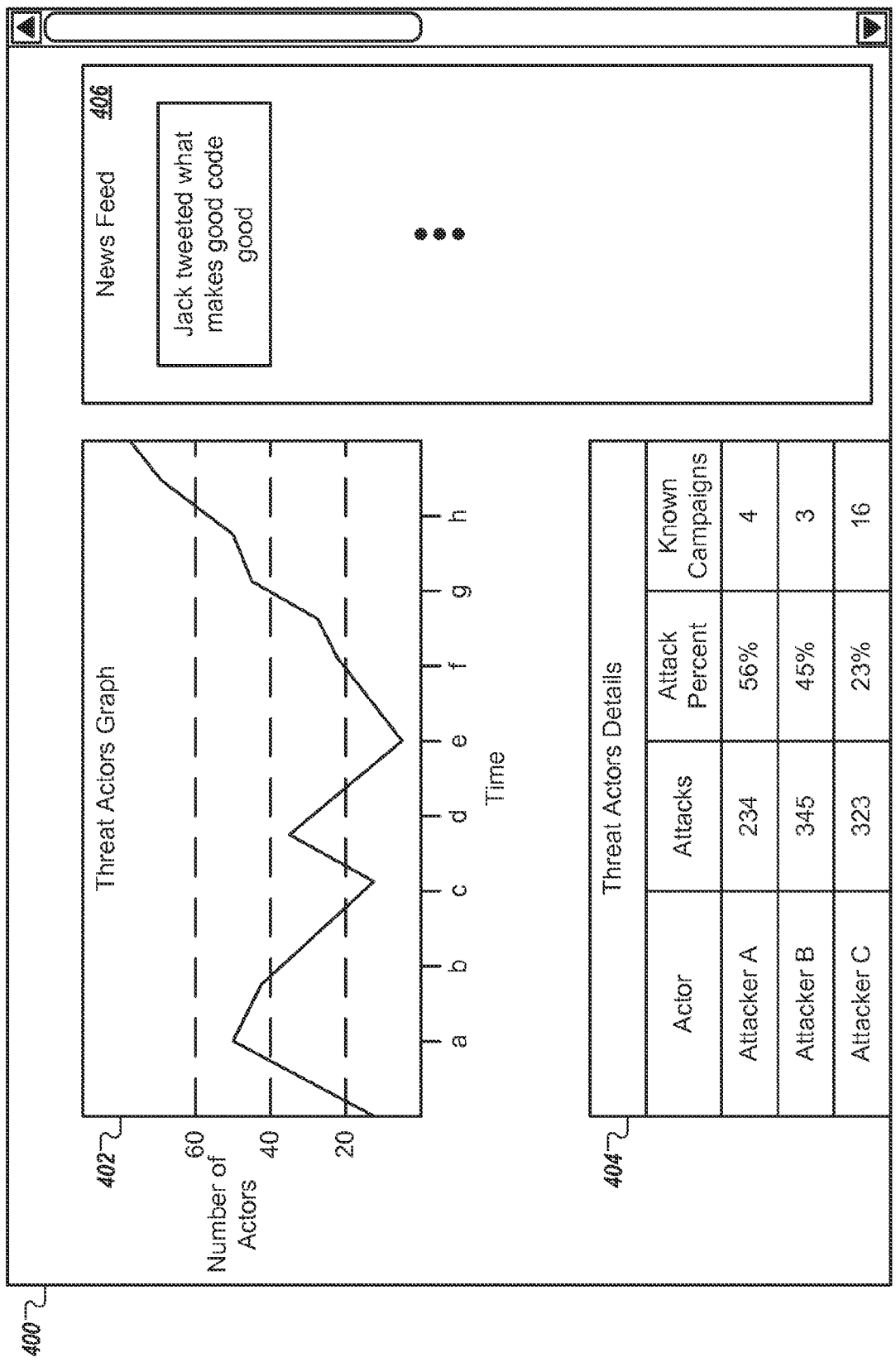
FIG. 4 is an example of a user interface that includes threat trend information.

FIG. 4 is an example of a user interface 400 that includes threat trend information. For instance, the analysis system may provide a third party system with security threat information and the third party system may use the received security threat information to generate the user interface 400. In some implementations, the analysis system may provide the third party system with instructions for the presentation of the user interface 400.

The user interface 400 includes a threat actors graph 402 with information about a quantity of threat actors over a particular period of time. The particular period of time may be the most recent year, month, week, or another time range, e.g., determined by a user of the user interface 400.

The quantity of threat actors may be specific to a particular industry, e.g., retail, a particular organization or entity, e.g., Company A, or for all known threat actors during the particular period of time. The quantity of threat actors may include only unique instances of threat actors or may include multiple instances of the same threat actor. For example, when a particular group attacks two different organizations using different techniques, the quantity of threat actors may count this particular group once, e.g., only unique instances of threat actors, or twice, e.g., for each attack performed by the particular group. In the latter example, the threat actors graph 402 may be a threat attacks graph that shows trends in a quantity of attacks over time.

Threat actors details 404 may include details about some of or all of the threat actors identified in the threat actors graph 402. For instance, for each threat actor included in the threat actors graph 402, the threat actors details 404 may include the number of attacks performed by that actor, e.g., during the predetermined period of time or at any time, an attack percentage for the respective actor, e.g., a ratio of the quantity of attacks associated with the respective actor to the quantity of attacks that have been carried out by all other threat actors, and the number of threat campaigns performed by the respective threat actor, e.g., during the predetermined period of time or at any time. In some examples, a sum of all the attack percentages may be greater than 100%, e.g., when multiple actors are involved in the same attack. In some examples, a sum of all the attack percentages, e.g., by attacker A, attacker B, and attacker C, may be 100%, e.g., when only a single attacker is associated with each attack. In some implementations, a sum of all the attack percentages may be less than 100%, e.g., when some attacks are not attributed to any attacker.

The user interface 400 may include additional information, such as a news feed 406 with information about security threats, potential security threats, solutions to security threats, or other relevant information. In some examples, the user interface 400 may include information about trends for particular types of threats, such as DDoS, particular types of threat campaigns, or other types of trend information determined using the data constructs.

Figure 5:
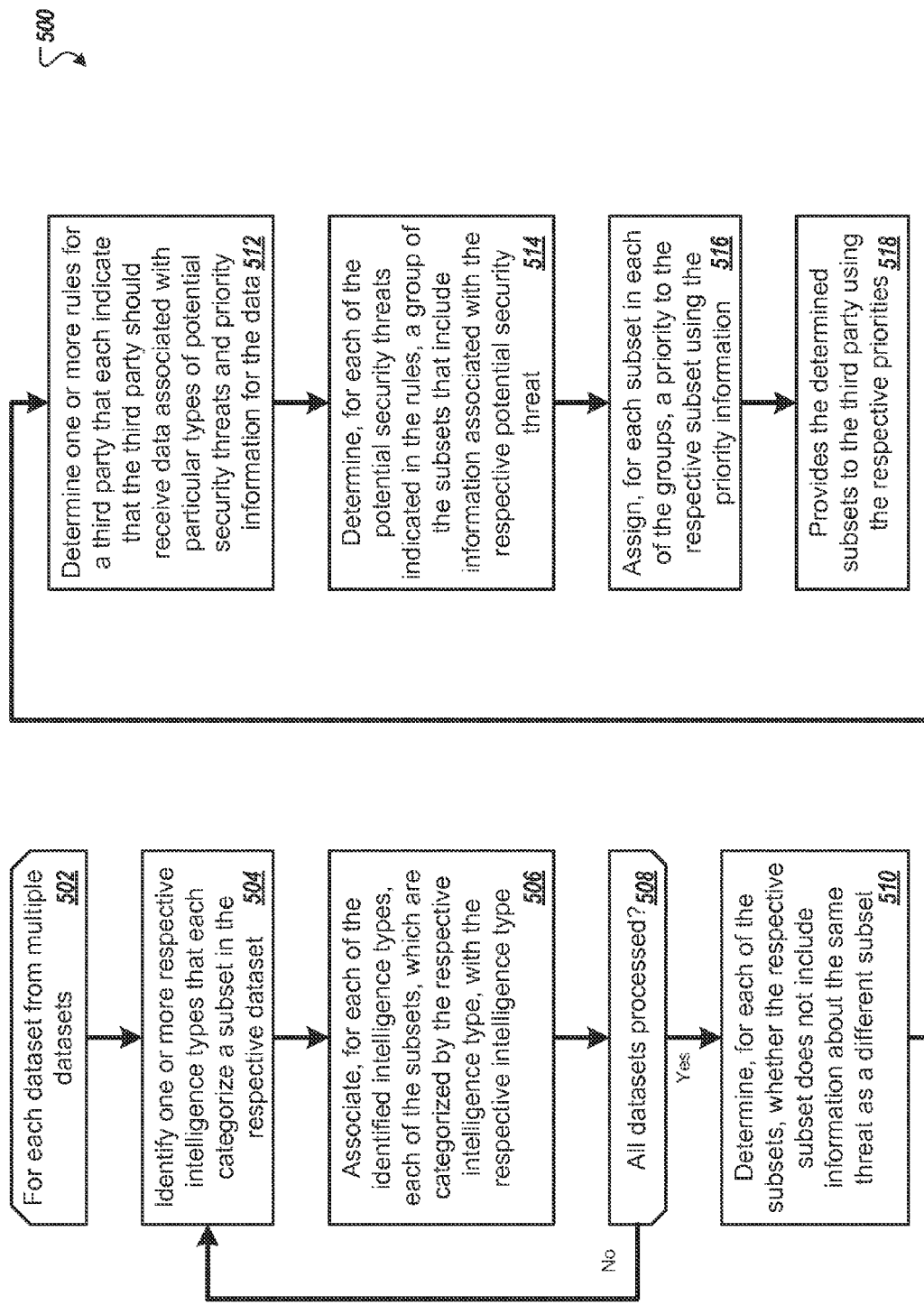
FIG. 5 is a flow diagram of a process for providing data to third parties using third party rules.

FIG. 5 is a flow diagram of a process 500 for providing data to third parties using third party rules. For example, the process 500 can be used by the analysis system 202 from the environment 200.

For each dataset from multiple datasets (502), the process identifies one or more respective intelligence types that each categorizes a subset in the respective dataset (504). For instance, a parser may parse the datasets to create subsets and identify at least one intelligence type for each of the subsets.

The process associates, for each of the identified intelligence types, each of the subsets, which are categorized by the respective intelligence type, with the respective intelligence type (506). For example, a parser creates a data construct for each of the subsets. The data construct includes data from the respective subset and an identification of the intelligence type, e.g., using an identifier or a particular type of data construct for the respective intelligence type, and stores the data construct in a construct database.

The process determines whether all of the datasets are processed (508) and, if so, determines, for each of the subsets, whether the respective subset does not include information about the same threat as a different subset (510). For instance, a de-duplication module determines whether some of the subsets, or the respective data constructs, should be merged, linked, or discarded, as described above. If the process determines that not all of the datasets are processed, the process identifies one or more respective intelligence types for one of the unprocessed datasets.

The process determines one or more rules for a third party that each indicate that the third party should receive data associated with particular types of potential security threats and priority information for the data (512). The particular types of potential security threats may be specific to a particular software application, hardware device, or both. For example, a rule may indicate that data constructs for a particular operating system, for specific software for a particular operating system, or for particular software for a certain type of hardware, e.g., brand, model, or instruction set, should be sent to the third party.

The process determines, for each of the potential security threats indicated in the rules, a group of the subsets that include information associated with the respective potential security threat (514). For instance, the analysis system uses the rules to determine which data constructs correspond with the rules for a particular third party, e.g., and have not already been sent to that particular third party. The analysis system may use a frequency of updates, specified by the rules, to determine when to send data constructs to the third party, e.g., and determine the data constructs that have been created or updated since the last time data constructs were sent to the particular third party.

The process assigns, for each subset in each of the groups, a priority to the respective subset using the priority information (516). For example, a priority module uses the priority information, which may directly or indirectly correspond with the potential security threats, to determine a priority for the data constructs, e.g., which data constructs are more likely to be of greater importance to the third party than the other data constructs. In some examples, each of the potential security threats in the rules may include corresponding priority information for the priority module to use when determining the priorities.

In some examples, the priority module determines priority information using machine learning. For instance, the priority module may determine that the third party requests additional information for certain types of potential security threats, and not others, and rank data constructs for those certain types of potential security threats with a higher priority than data constructs for the other types of potential security threats.

The process provides the determined subsets to the third party using the respective priorities (518). For example, the analysis system provides each of the data constructs in a system of the third party, e.g., with each data construct in a separate message or with all of the data constructs in a message feed.

The order of steps in the process 500 described above is illustrative only, and the providing the data to the third parties using the third party rules can be performed in different orders. For example, the analysis system may determine the rules before identifying the intelligence types that each categorize the subset in the respective data type, e.g., perform step 512 before step 504.

In some implementations, the process 500 can include additional steps, fewer steps, or some of the steps can be divided into multiple steps. For example, the process can receive the datasets from multiple sources and parse each of the datasets into the subsets.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output.

The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 6:
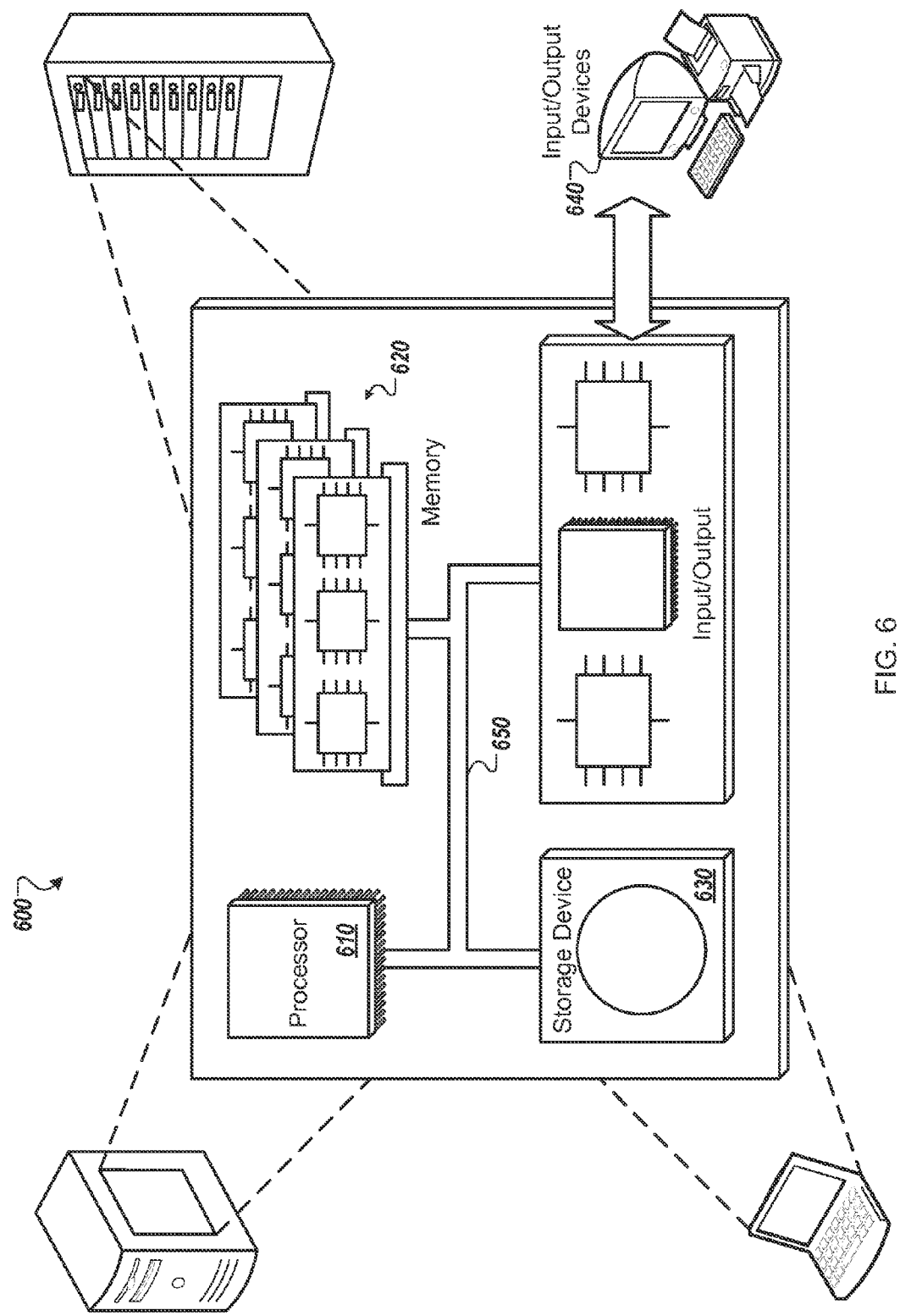
FIG. 6 is a block diagram of a computing system that can be used in connection with computer-implemented methods described in this document.

An example of one such type of computer is shown in FIG. 6, which shows a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   determining, by one or more computers in an analysis system, one or more intelligence types;
   categorizing, by at least one of the computers and for each dataset from multiple datasets that each include information about potential security threats, each subset of data for the respective dataset, the categorizing comprising:
      identifying, by at least one of the computers and for each of the subsets of data in the respective dataset, an intelligence type that categorizes the subset of data; and
      associating, by at least one of the computers and for each of the subsets of data in the respective dataset, the subset of data with the corresponding intelligence type;
   determining, by at least one of the computers, one or more third party rules that each indicate particular data a particular third party system should receive from the analysis system and third party priority information that represents an order in which the particular data should be provided to the particular third party system, the particular data comprising at least one of i) data representing particular types of the potential security threats, or ii) data categorized by one or more particular intelligence types;
   determining, by a rule application module on at least one of the computers and for each of the one or more third party rules, a group of the subsets that include information associated with the particular types of the potential security threats or the particular intelligence types;
   assigning, by a prioritization module on at least one of the computers and for each subset in each of the groups, a priority to the respective subset using the priority information from the third party rules; and
   sending, by at least one of the computers and to the particular third party system, the subsets in the group of the subsets using the respective priorities.

2. The method of claim 1 wherein sending, by at least one of the computers and to the particular third party system, the subsets in the group of the subsets using the respective priorities comprises sending the subsets in the group of the subsets for presentation according to the respective priorities.

3. The method of claim 1 comprising:
   receiving, by at least one of the computers, the datasets from one or more sources; and
   parsing, by at least one of the computers, each of the datasets into the subsets of data, wherein identifying the respective intelligence types that each categorize a subset of data in the respective dataset comprises identifying the respective intelligence types that each categorize one of the parsed subsets.

4. The method of claim 1 comprising:
   determining, by at least one of the computers and for each of the categorized subsets, whether the respective subset does not comprise information about the same threat as a different subset prior to determining the group of the subsets; and
   determining that a first subset from the subsets does not comprise information about the same threat as a second different subset in response to determining whether the respective subset does not comprise information about the same threat as a different subset, wherein determining, for each of the third party rules, the group of the subsets that include information associated with the particular types of the potential security threats or the particular intelligence types comprises determining the group of the subsets that comprises the first subset.

5. The method of claim 1 comprising:
   determining, by at least one of the computers and for each of the categorized subsets, whether the respective subset does not comprise information about the same threat as a different subset prior to determining the group of the subsets; and
   determining that a first subset from the subsets comprises information about the same threat as a second different subset in response to determining whether the respective subset does not comprise information about the same threat as a different subset, wherein determining, for each of the third party rules, the group of the subsets that include information associated with the particular types of the potential security threats or the particular intelligence types comprises determining the group of the subsets that comprises the second different subset and does not comprise the first subset.

6. The method of claim 5 comprising determining that the first subset comprises information with an older timestamp than the second different subset, wherein determining the group of the subsets that comprises the second different subset and does not comprise the first subset comprises determining the group of the subsets that comprises the second different subset and does not comprise the first subset in response to determining that the first subset comprises information with the older timestamp than the second different subset.

7. The method of claim 5 comprising determining that the first subset comprises information from a less reputable source than the second different subset, wherein determining the group of the subsets that comprises the second different subset and does not comprise the first subset comprises determining the group of the subsets that comprises the second different subset and does not comprise the first subset in response to determining that the first subset comprises information from a less reputable source than the second different subset.

8. The method of claim 7 comprising determining that content in the first subset varies from content in the second different subset by more than a threshold amount.

9. The method of claim 1 comprising:
   determining, by at least one of the computers and for each of the categorized subsets, whether the respective subset does not comprise information about the same threat as a different subset;
   determining that a first subset from the subsets comprises information about the same threat as a second different subset in response to determining whether the respective subset does not comprise information about the same threat as a different subset; and merging the first subset with the corresponding different subset prior to determining the group of the subsets and in response to determining that the first subset from the subsets comprises information about the same threat as the second different subset.

10. The method of claim 9 comprising determining that the first subset varies from the second different subset by less than a threshold amount, wherein merging the first subset with the second different subset comprises merging the first subset with the second different subset in response to determining that the first subset varies from the second different subset by less than the threshold amount.

11. The method of claim 1 comprising:
determining, by at least one of the computers and for each of the categorized subsets, whether the respective subset does not comprise information about the same threat as a different subset;
determining that a first subset from the subsets comprises information about the same threat as a second different subset in response to determining whether the respective subset does not comprise information about the same threat as a different subset;
determining that the first subset varies from the second different subset by more than a threshold amount; and
linking the first subset with the second different subset prior to determining the group of the subsets and in response to determining that the first subset varies from the corresponding second different subset by more than a threshold amount.

12. The method of claim 1, wherein the priority information comprises priority information for the particular types of the potential security threats.

13. The method of claim 1, wherein determining, for each of the third party rules, the group of the subsets that include information associated with the particular types of the potential security threats or the particular intelligence types comprises determining, for one of the particular types of the potential security threats that identifies a particular software application used by the third party, that each of the subsets in the groups of subsets include information about the particular software application.

14. The method of claim 1, wherein determining, for each of the third party rules, the group of the subsets that include information associated with the particular types of the potential security threats or the particular intelligence types comprises determining, for one of the particular types of the potential security threats that identifies a particular hardware device used by the third party, that each of the subsets in the groups of subsets include information about the particular hardware device.

15. A system comprising:
one or more computers and one or more storage devices storing instructions that are operable, when executed by the one or more computers, to cause the one or more computers to perform operations comprising:
determining, by one or more computers in an analysis system, one or more intelligence types;
categorizing, by at least one of the computers and for each dataset from multiple datasets that each include information about potential security threats, each subset of data for the respective dataset, the categorizing comprising:
identifying, by at least one of the computers and for each of the subsets of data in the respective dataset, an intelligence type that categorizes the subset of data; and
associating, by at least one of the computers and for each of the subsets of data in the respective dataset, the subset of data with the corresponding intelligence type;
determining, by at least one of the computers, one or more third party rules that each indicate particular data a particular third party system should receive from the analysis system and third party priority information that represents an order in which the particular data should be provided to the particular third party system, the particular data comprising at least one of i) data representing particular types of the potential security threats, or ii) data categorized by one or more particular intelligence types;
determining, by at least one of the computers and for each of the third party rules, a group of the subsets that include information associated with the particular types of the potential security threats or the particular intelligence types;
assigning, by at least one of the computers and for each subset in each of the groups, a priority to the respective subset using the priority information from the third party rules; and
sending, by at least one of the computers and to the s articular third party system, the subsets in the group of the subsets using the respective priorities.

16. The system of claim 15 wherein sending, by at least one of the computers and to the particular third party system, the subsets in the group of the subsets using the respective priorities comprises sending the subsets in the group of the subsets for presentation according to the respective priorities.

17. A non-transitory computer storage medium encoded with instructions that, when executed by a computer, cause the computer to perform operations comprising:
determining, by one or more computers in an analysis system, one or more intelligence types;
categorizing, by at least one of the computers and for each dataset from multiple datasets that each include information about potential security threats, each subset of data for the respective dataset, the categorizing comprising:
identifying, for each of the subsets of data in the respective dataset, an intelligence type that categorizes the subset of data; and
associating, for each of the subsets of data in the respective dataset, the subset of data, with the corresponding intelligence type;
determining one or more third party rules that each indicate particular data a particular third party system should receive from the analysis system and third party priority information that represents an order in which the particular data should be provided to the particular third party system, the particular data comprising at least one of i) data representing particular types of the potential security threats, or ii) data categorized by one or more particular intelligence types;
determining, for each of the third party rules, a group of the subsets that include information associated with the particular types of the potential security threats or the particular intelligence types;
assigning, for each subset in each of the groups, a priority to the respective subset using priority information from the third party rules; and
sending the subsets in the group of the subsets to the particular third party system using the respective priorities.

18. The computer storage medium of claim 17 wherein sending the subsets in the group of the subsets to the particular third party system using the respective priorities comprises sending the subsets in the group of the subsets for presentation according to the respective priorities.

19. The method of claim 1, wherein determining the one or more intelligence types comprises determining at least one of a) an observable intelligence type, b) an indicator of compromise intelligence type, c) a vulnerability intelligence type, d) an exploit intelligence type, e) an adversary tactics, techniques, and procedures intelligence type, f) a threat actor intelligence type, g) a threat campaign intelligence type, or h) a courses of action intelligence type.

20. The method of claim 1, wherein:
at least one of the datasets from the multiple datasets comprises a data feed; and
categorizing, for each dataset from the multiple datasets that each include information about potential security threats, each subset of data in the respective dataset comprises parsing, by a parser, data from the data feed to generate the subsets of data for the data feed.

21. The method of claim 1, wherein:
determining one or more third party rules that each indicate particular data a particular third party system should receive from the analysis system and third party priority information that represents an order in which the particular data should be provided to the particular third party system, the particular data comprising at least one of i) data representing particular types of the potential security threats, or ii) data categorized by one or more particular intelligence types comprises determining at least one third party rule that indicates data categorized by one or more particular intelligence types; and
determining, by at least one of the computers and for each of the one or more third party rules, a group of the subsets that include information associated with the particular types of the potential security threats or the particular intelligence types comprises determining, for each of the at least one third party rules, the group of the subsets that include information associated with the one or more particular intelligence types.

22. The method of claim 1, wherein:
determining one or more third party rules that each indicate particular data a particular third party system should receive from the analysis system and third party priority information that represents an order in which the particular data should be provided to the particular third party system, the particular data comprising at least one of i) data representing particular types of the potential security threats, or ii) data categorized by one or more particular intelligence types comprises determining at least one third party rule that indicates data representing particular types of the potential security threats; and
determining, by at least one of the computers and for each of the one or more third party rules, a group of the subsets that include information associated with the particular types of the potential security threats or the particular intelligence types comprises determining, for each of the at least one third party rules, the group of the subsets that include information associated with the particular types of the potential security threats.

23. The method of claim 22, wherein determining the at least one third party rule that indicates data representing particular types of the potential security threats comprises determining at least one third party rule that indicates data for at least one of a particular industry, or a particular software application.

24. The method of claim 1, wherein:
determining one or more third party rules that each indicate particular data a particular third party system should receive from the analysis system and third party priority information that represents an order in which the particular data should be provided to the particular third party system, the particular data comprising at least one of i) data representing particular types of the potential security threats, or ii) data categorized by one or more particular intelligence types comprises:
determining a first third party rule that indicates data representing particular types of the potential security threats; and
determining a second third party rule that data categorized by one or more particular intelligence types; and
determining, by at least one of the computers and for each of the one or more third party rules, a group of the subsets that include information associated with the particular types of the potential security threats or the particular intelligence types comprises:
determining, for the first third party rule, a group of the subsets that include information associated with the particular types of the potential security threats; and
determining, for the second third party rule, a group of the subsets that include information associated with the one or more particular intelligence types.

25. The method of claim 1, wherein determining one or more third party rules that each indicate particular data a particular third party system should receive from the analysis system and third party priority information that represents an order in which the particular data should be provided to the particular third party system, the particular data comprising at least one of i) data representing particular types of the potential security threats, or ii) data categorized by one or more particular intelligence types comprises determining the third party rules that each comprise an address for the particular third party system.

26. The system of claim 15, the operations comprising:
receiving, by at least one of the computers, the datasets from one or more sources; and
parsing, by at least one of the computers, each of the datasets into the subsets of data, wherein identifying the respective intelligence types that each categorize a subset of data in the respective dataset comprises identifying the respective intelligence types that each categorize one of the parsed subsets.

27. The system of claim 15, the operations comprising:
determining, by at least one of the computers and for each of the categorized subsets, whether the respective subset does not comprise information about the same threat as a different subset prior to determining the group of the subsets; and
determining that a first subset from the subsets does not comprise information about the same threat as a second different subset in response to determining whether the respective subset does not comprise information about the same threat as a different subset, wherein determining, for each of the third party rules, the group of the subsets that include information associated with the particular types of the potential security threats or the particular intelligence types comprises determining the group of the subsets that comprises the first subset.

28. The system of claim 15, the operations comprising:
determining, by at least one of the computers and for each of the categorized subsets, whether the respective subset does not comprise information about the same threat as a different subset prior to determining the group of the subsets; and determining that a first subset from the subsets comprises information about the same threat as a second different subset in response to determining whether the respective subset does not comprise information about the same threat as a different subset, wherein determining, for each of the third party rules, the group of the subsets that include information associated with the particular types of the potential security threats or the particular intelligence types comprises determining the group of the subsets that comprises the second different subset and does not comprise the first subset.

29. The system of claim 28, the operations comprising determining that the first subset comprises information with an older timestamp than the second different subset, wherein determining the group of the subsets that comprises the second different subset and does not comprise the first subset comprises determining the group of the subsets that comprises the second different subset and does not comprise the first subset in response to determining that the first subset comprises information with the older timestamp than the second different subset.

30. The system of claim 28, the operations comprising determining that the first subset comprises information from a less reputable source than the second different subset, wherein determining the group of the subsets that comprises the second different subset and does not comprise the first subset comprises determining the group of the subsets that comprises the second different subset and does not comprise the first subset in response to determining that the first subset comprises information from a less reputable source than the second different subset.

31. The system of claim 30, the operations comprising determining that content in the first subset varies from content in the second different subset by more than a threshold amount.

32. The system of claim 15, the operations comprising:
determining, by at least one of the computers and for each of the categorized subsets, whether the respective subset does not comprise information about the same threat as a different subset;
determining that a first subset from the subsets comprises information about the same threat as a second different subset in response to determining whether the respective subset does not comprise information about the same threat as a different subset; and
merging the first subset with the second different subset prior to determining the group of the subsets and in response to determining that the first subset from the subsets comprises information about the same threat as the second different subset.

33. The system of claim 32, the operations comprising determining that the first subset varies from the second different subset by less than a threshold amount, wherein merging the first subset with the second different subset comprises merging the first subset with the second different subset in response to determining that the first subset varies from the second different subset by less than the threshold amount.

34. The system of claim 15, the operations comprising:
determining, by at least one of the computers and for each of the categorized subsets, whether the respective subset does not comprise information about the same threat as a different subset;
determining that a first subset from the subsets comprises information about the same threat as a second different subset in response to determining whether the respective subset does not comprise information about the same threat as a different subset;
determining that the first subset varies from the second different subset by more than a threshold amount; and
linking the first subset with the second different subset prior to determining the group of the subsets and in response to determining that the first subset varies from the second different subset by more than a threshold amount.

35. The system of claim 15, wherein the priority information comprises priority information for the particular types of the potential security threats.

36. The system of claim 15, wherein determining, for each of the third party rules, the group of the subsets that include information associated with the particular types of the potential security threats or the particular intelligence types comprises determining, for one of the particular types of the potential security threats that identifies a particular software application used by the third party, that each of the subsets in the groups of subsets include information about the particular software application.

37. The system of claim 15, wherein determining, for each of the third party rules, the group of the subsets that include information associated with the particular types of the potential security threats or the particular intelligence types comprises determining, for one of the particular types of the potential security threats that identifies a particular hardware device used by the third party, that each of the subsets in the groups of subsets include information about the particular hardware device.

38. The system of claim 15, wherein:
at least one of the datasets from the multiple datasets comprises a data feed; and
categorizing, for each dataset from the multiple datasets that each include information about potential security threats, each subset of data in the respective dataset comprises parsing, by a parser, data from the data feed to generate the subsets of data for the data feed.

39. The system of claim 15, wherein:
determining one or more third party rules that each indicate particular data a particular third party system should receive from the analysis system and third party priority information that represents an order in which the particular data should be provided to the particular third party system, the particular data comprising at least one of i) data representing particular types of the potential security threats, or ii) data categorized by one or more particular intelligence types comprises determining at least one third party rule that indicates data categorized by one or more particular intelligence types; and
determining, by at least one of the computers and for each of the one or more third party rules, a group of the subsets that include information associated with the particular types of the potential security threats or the particular intelligence types comprises determining, for each of the at least one third party rules, the group of the subsets that include information associated with the one or more particular intelligence types.

40. The system of claim 15, wherein:
determining one or more third party rules that each indicate particular data a particular third party system should receive from the analysis system and third party priority information that represents an order in which the particular data should be provided to the particular third party system, the particular data comprising at least one of i) data representing particular types of the potential security threats, or ii) data categorized by one or more particular intelligence types comprises determining at least one third party rule that indicates data representing particular types of the potential security threats; and determining, by at least one of the computers and for each of the one or more third party rules, a group of the subsets that include information associated with the particular types of the potential security threats or the particular intelligence types comprises determining, for each of the at least one third party rules, the group of the subsets that include information associated with the particular types of the potential security threats.

41. The system of claim 40, wherein determining the at least one third party rule that indicates data representing particular types of the potential security threats comprises determining at least one third party rule that indicates data for at least one of a particular industry, or a particular software application.

42. The system of claim 15, wherein:
determining one or more third party rules that each indicate particular data a particular third party system should receive from the analysis system and third party priority information that represents an order in which the particular data should be provided to the particular third party system, the particular data comprising at least one of i) data representing particular types of the potential security threats, or ii) data categorized by one or more particular intelligence types comprises:
determining a first third party rule that indicates data representing particular types of the potential security threats; and
determining a second third party rule that data categorized by one or more particular intelligence types; and
determining, by at least one of the computers and for each of the one or more third party rules, a group of the subsets that include information associated with the particular types of the potential security threats or the particular intelligence types comprises:
determining, for the first third party rule, a group of the subsets that include information associated with the particular types of the potential security threats; and
determining, for the second third party rule, a group of the subsets that include information associated with the one or more particular intelligence types.

43. The system of claim 15, wherein determining one or more third party rules that each indicate particular data a particular third party system should receive from the analysis system and third party priority information that represents an order in which the particular data should be provided to the particular third party system, the particular data comprising at least one of i) data representing particular types of the potential security threats, or ii) data categorized by one or more particular intelligence types comprises determining the third party rules that each comprise an address for the particular third party system.

* * * * *